(12) United States Patent
Schmitz

(10) Patent No.: US 10,287,983 B2
(45) Date of Patent: May 14, 2019

(54) CROSS-STREAM HEAT EXCHANGER

(71) Applicant: United Technologies Corporation, Farmington, CT (US)

(72) Inventor: John T. Schmitz, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 260 days.

(21) Appl. No.: 15/109,183

(22) PCT Filed: Oct. 6, 2014

(86) PCT No.: PCT/US2014/059220
§ 371 (c)(1),
(2) Date: Jun. 30, 2016

(87) PCT Pub. No.: WO2015/105552
PCT Pub. Date: Jul. 16, 2015

(65) Prior Publication Data
US 2017/0260905 A1    Sep. 14, 2017

Related U.S. Application Data

(60) Provisional application No. 61/924,588, filed on Jan. 7, 2014.

(51) Int. Cl.
*F02C 6/08* (2006.01)
*F02C 7/18* (2006.01)
(Continued)

(52) U.S. Cl.
CPC .............. *F02C 7/185* (2013.01); *F01D 25/12* (2013.01); *F02C 7/04* (2013.01); *F02K 3/115* (2013.01);
(Continued)

(58) Field of Classification Search
CPC .. F01D 25/12; F02C 7/04; F02C 7/185; F02K 3/115; F05D 2260/213; F28F 13/06; Y02T 50/676
See application file for complete search history.

(56) References Cited

U.S. PATENT DOCUMENTS 4,254,618 A * 3/1981 Elovic ..................... F02C 7/185
60/226.1
4,546,605 A   10/1985 Mortimer et al.
(Continued)

OTHER PUBLICATIONS

Written Opinion for International Application No. PCT/US2014/059220; dated Jan. 27, 2015.
(Continued)

*Primary Examiner* — Jesse S Bogue
(74) *Attorney, Agent, or Firm* — Cantor Colburn LLP

(57) ABSTRACT

A heat exchanger system for a gas turbine engine is disclosed. The heat exchanger system may include a first structure at least partially defining a first plenum configured to receive a first air stream, a second structure at least partially defining a second plenum configured to receive a second air stream having lower pressure than the first air stream, a third structure at least partially defining a third plenum configured to receive a third air stream having lower pressure than the second air stream, and a heat exchanger configured for operative communication with the first air stream, the second air stream, and the third air stream while disposed between the second air stream and the third air stream. The heat exchanger may be configured to transfer heat from the first air stream to the third air stream.

20 Claims, 9 Drawing Sheets

(51) Int. Cl.
  *F01D 25/12* (2006.01)
  *F02C 7/04* (2006.01)
  *F28F 13/06* (2006.01)
  *F02K 3/115* (2006.01)

(52) U.S. Cl.
  CPC ........ *F28F 13/06* (2013.01); *F05D 2260/213* (2013.01); *Y02T 50/676* (2013.01)

(56) References Cited

U.S. PATENT DOCUMENTS

| | | | | |
|---|---|---|---|---|
| 5,269,135 A * | 12/1993 | Vermejan | ................... | F02C 7/04 60/226.1 |
| 5,581,996 A * | 12/1996 | Koch | ................... | F01D 5/141 60/266 |
| 7,856,824 B2 * | 12/2010 | Anderson | ............... | B64D 13/08 60/226.1 |
| 7,926,261 B2 * | 4/2011 | Porte | ................... | B64D 13/06 60/226.1 |
| 8,397,487 B2 * | 3/2013 | Sennoun | ................ | B64D 13/06 60/266 |
| 8,739,516 B2 * | 6/2014 | Bulin | ................... | F02C 7/14 60/226.1 |
| 9,212,623 B2 * | 12/2015 | Murphy | ................... | F02K 1/46 |
| 9,267,390 B2 * | 2/2016 | Lo | ............... | F02C 6/08 |
| 10,119,477 B2 * | 11/2018 | Hanlon | ................... | F02C 9/18 |
| 2007/0130912 A1 * | 6/2007 | Kraft | ................... | F02C 6/08 60/226.1 |
| 2009/0169359 A1 * | 7/2009 | Murphy | ................... | F02K 1/46 415/115 |
| 2010/0139288 A1 | 6/2010 | Rago | | |
| 2011/0150634 A1 | 6/2011 | Bajusz et al. | | |
| 2011/0162387 A1 | 7/2011 | Chir et al. | | |
| 2012/0144842 A1 | 6/2012 | Snyder | | |
| 2012/0144843 A1 | 6/2012 | Donovan et al. | | |
| 2016/0298550 A1 * | 10/2016 | Kupratis | ................... | F02C 3/13 |

OTHER PUBLICATIONS

International Search Report for International Application No. PCT/US2014/059220; dated Jan. 27, 2015.
European Search Report Issued in EP Application No. 14877604.0, dated Aug. 1, 2017, 8 Pages.

* cited by examiner

CROSS-STREAM HEAT EXCHANGER

The application is a National Phase Application of Patent Application PCT/US2014/059220 filed on Oct. 6, 2014, which claims the benefit of and priority to U.S. Provisional Patent Application No. 61/924,588, filed Jan. 7, 2014, the contents each of which are incorporated herein by reference in their entirety.

FIELD OF THE DISCLOSURE

The present disclosure relates generally to gas turbine engines and, more particularly, to heat exchanger systems for gas turbine engines.

BACKGROUND OF THE DISCLOSURE

Gas turbine engines may typically include a fan, a compressor, a combustor, and a turbine, with an annular flow path extending axially through each. Initially, the fan, which is powered by the turbine, draws ambient air into the engine. Part of the air flows through the compressor where it is compressed or pressurized. The combustor then mixes and ignites the compressed air with fuel, generating hot combustion gases. These hot combustion gases are then directed from the combustor to the turbine where power is extracted from the hot gases by causing blades of the turbine to rotate. This flow path may be referred to as a core flow path. The other part of the airflow from the fan, which may be referred to as a bypass flow path, is used to generate forward thrust.

Gas turbine engines operate at extremely high temperatures. These temperatures may exceed the temperature limits of some of the materials of the engine components. Therefore, cooling air may be supplied to the engine components in order to cool the hot components. For example, cooling air may be extracted from the compressor section and directed to certain components of the turbine section.

Furthermore, in some cases, the cooling air extracted from the compressor section may have to be further cooled by fan air from the bypass flow path before being delivered to the turbine components. This air may be referred to as cooled cooling air (CCA). CCA may be supplied continuously throughout engine operation. However, there may be situations when CCA is not required, which results in pressure loss for a specific thrust requirement, thereby reducing fuel burn.

Accordingly, there exists a need for a system and method that adequately provides CCA to turbine components while minimizing pressure loss.

SUMMARY OF THE DISCLOSURE

According to one embodiment of the present disclosure, a heat exchanger system for a gas turbine engine is disclosed. The heat exchanger system may comprise a first structure at least partially defining a first plenum configured to receive a first air stream, a second structure at least partially defining a second plenum configured to receive a second air stream having lower pressure than the first air stream, a third structure at least partially defining a third plenum configured to receive a third air stream having lower pressure than the second air stream, and a heat exchanger configured for operative communication with the first air stream, the second air stream, and the third air stream while disposed between the second air stream and the third air stream. The heat exchanger may be configured to transfer heat from the first air stream to the third air stream.

In a refinement, the heat exchanger may be disposed within a second duct surrounding the second air stream, the second duct including aerodynamic surfaces surrounding the heat exchanger.

In another refinement, the first air stream may comprise a core flow path, and each of the second air stream and the third air stream may be comprised of a bypass flow path.

In another refinement, the heat exchanger may include: a first inlet associated with the first air stream, a first exit associated with a cooling air, a plurality of first passages extending from the first inlet to the first exit, a second inlet associated with the second air stream, a second exit associated with the third air stream, and a plurality of second passages extending from the second inlet to the second exit. A portion of the first air stream may flow into the first inlet through the plurality of first passages and out of the first exit. A portion of the second air stream may flow into the second inlet through the plurality of second passages and out of the second exit. The heat exchanger may transfer heat between the portion of the first air stream in the plurality of first passages and the portion of the second air stream in the plurality of second passages.

In another refinement, the cooling air exiting from the first exit of the heat exchanger may be used to cool components of the gas turbine engine.

In another refinement, the heat exchanger may include a scoop designed to capture air flow.

In another refinement, the heat exchanger may include a flow metering device configured to control flow through the heat exchanger.

In another refinement, the flow metering device may be positioned proximate a forward side of the heat exchanger.

In another refinement, the flow metering device may be positioned proximate an aft side of the heat exchanger.

In another refinement, the flow metering device may be positioned proximate an inlet or an exit of the heat exchanger.

According to another embodiment of the present disclosure, a method for cooling components of a gas turbine engine is disclosed. The method may comprise installing a heat exchanger between two air streams having different air pressures, using the heat exchanger to cool air from a core flow path of the gas turbine engine, and supplying the cooled air from the heat exchanger to components of the gas turbine engine.

In a refinement, the method may further comprise providing the heat exchanger with a flow metering device configured to modulate flow through the heat exchanger.

In another refinement, the method may further comprise selectively allowing flow through the heat exchanger using the flow metering device.

In another refinement, the method may further comprise opening the flow metering device to allow flow through the heat exchanger when cooling air is required.

In another refinement, the method may further comprise closing the flow metering device to stop flow through the heat exchanger when cooling air is not required.

In another refinement, the method may further comprise providing the flow metering device proximate an inlet or an exit of the heat exchanger.

According to yet another embodiment of the present disclosure, a gas turbine engine is disclosed. The gas turbine engine may comprise a first air duct surrounding a first air stream, a second air duct surrounding a second air stream, a third air duct surrounding a third air stream, and a heat exchanger disposed within the second air duct. The second air stream may surround the first air duct and have a lower pressure than the first air stream. The third air stream may surround the second air duct and have a lower pressure than the second air stream.

In a refinement, air flow from a combustor may mix with a cooling air from the heat exchanger for delivery to hot components.

In another refinement, the second air duct may include fairing members surrounding the heat exchanger.

In another refinement, the heat exchanger may include an integrated scoop and flow metering device to capture and modulate air flow.

These and other aspects and features of the disclosure will become more readily apparent upon reading the following detailed description when taken in conjunction with the accompanying drawings. Although various features are disclosed in relation to specific exemplary embodiments of the invention, it is understood that the various features may be combined with each other, or used alone, with any of the various exemplary embodiments of the invention without departing from the scope of the invention.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents falling within the spirit and scope of the present disclosure.

DETAILED DESCRIPTION

Figure 1:
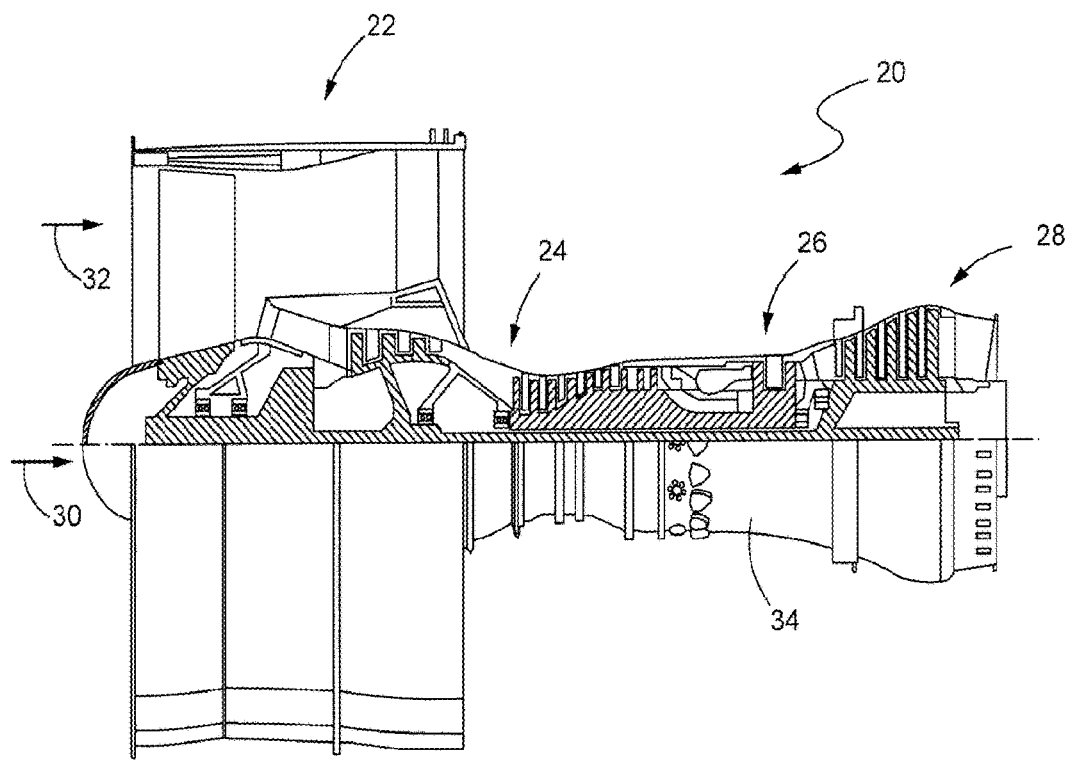
FIG. 1 is a side, partially cross-sectional view of a gas turbine engine, in accordance with the present disclosure.

Referring now to the drawings, and with specific reference to FIG. 1, in accordance with the teachings of the disclosure, an exemplary gas turbine engine 20 is shown. The gas turbine engine 20 may generally comprise a fan section 22 which draws ambient air into the engine 20, a compressor section 24 where part of the air flow from the fan section is pressurized, a combustor section 26 downstream of the compressor section which mixes and ignites the compressed air with fuel and thereby generates hot combustion gases, a turbine section 28 downstream of the combustor section 26 for extracting power from the hot combustion gases, and a first air stream 30 extending axially through each. The other part of the air flow from the fan section 22 may comprise a bypass flow path 32 used to generate forward thrust.

Gas turbine engine 20 may be used on an aircraft for generating thrust or power, or in land-based operations for generating power as well. It is understood that gas turbine engine 20 may include fewer or additional sections than fan section 22, compressor section 24, combustor section 26, and turbine section 28.

The first air stream 30 may flow along an annular core flow path of the gas turbine engine. An engine casing or first air duct 34 may enclose compressor section 24, combustor section 26, turbine section 28, and first air stream 30. Generally, the fan section 22 may drive air along the bypass flow path 32, and the compressor section 24 may drive air along the core flow path or first air stream 30.

Figure 2:
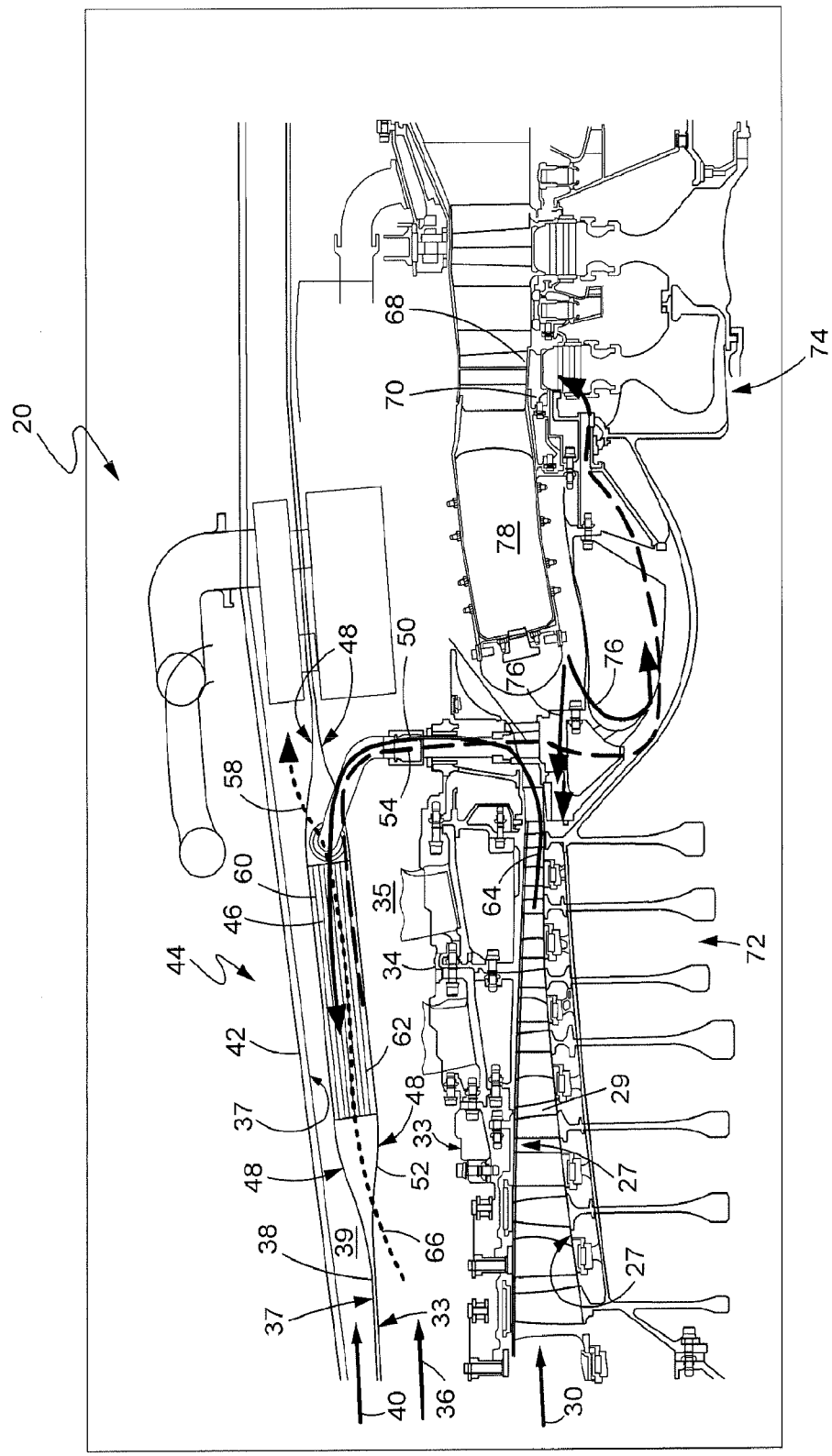
FIG. 2 is a cross-sectional view of a heat exchanger system installed in the gas turbine engine of FIG. 1, according to an embodiment of the present disclosure.

Referring now to FIG. 2, with continued reference to FIG. 1, a first plenum 29 may be configured to receive the first air stream 30, a second plenum 35 may be configured to receive a second air stream 36, and a third plenum 39 may be configured to receive a third air stream 40 within the gas turbine engine 20. Structures 27 may at least partially define the first plenum 29. Structures 33 may at least partially define the second plenum 35, and structures 37 may at least partially define the third plenum 39.

The second air stream 36 may surround the first air duct 34, and a second air duct 38 may enclose the second air stream 36. The third air stream 40 may surround the second air duct 38, and a third air duct 42 may enclose the third air stream 40. Each of the second air stream 36 and the third air stream 40 may be comprised of bypass flow paths from the fan section 22, e.g., a first fan stream and a second fan stream. The first air stream 30 may have a higher air pressure/temperature than the second air stream 36, and the second air stream 36 may have a higher air pressure/temperature than the third air stream 40.

A heat exchanger system 44 may be installed in the gas turbine engine 20 in order to supply cooled cooling air (CCA) to engine components. According to an embodiment of the present disclosure, the heat exchanger system 44 may comprise a heat exchanger 46 positioned between the second air stream 36 and the third air stream 40. For example, heat exchanger 46 may be disposed within the second air duct 38. Aerodynamic contouring may be applied to the heat exchanger system 44 in order to minimize pressure loss. For instance, the second air duct 38 may include aerodynamic surfaces 48 surrounding the heat exchanger 46. Aerodynamic surfaces 48 may comprise fairings designed to increase streamlining and reduce drag around the heat exchanger system 44. It is to be understood that the gas turbine engine 20 may include a plurality of heat exchanger systems 44 and a plurality of heat exchangers 46.

In operative communication with the first air stream 30, the second air stream 36, and the third air stream 40, heat exchanger 46 may be configured to transfer heat from one air stream to another in order to provide CCA to hot components of the gas turbine engine 20. For example, heat exchanger 46 may comprise a plate heat exchanger, although other types of heat exchangers are certainly possible. Heat exchanger 46 may include a first inlet 50 associated with the first air stream 30, a second inlet 52 associated with the second air stream 36, a first exit 54 associated with a cooling air or CCA 56, and a second exit 58 associated with the third air stream 40. The inlets 50, 52 and exits 54, 58 may comprise openings, apertures, pipes, tubes, or any other structure which provides communication of the heat exchanger 46 with the different air streams 30, 36, 40. A plurality of first parallel flow passages 60 may extend from the first inlet 50 to the first exit 54, and a plurality of second parallel flow passages 62 may extend from the second inlet 52 to the second exit 58.

A portion 64 of the first air stream 30 may be extracted from the compressor section 24, such as, from a low or high compressor, in order to be cooled for the supply of CCA to hot components of the gas turbine engine 20. Since the second air stream 36 has a lower temperature than the first air stream 30, a portion 66 of the second air stream 36 may be used to cool the portion 64 of the first air stream 30 via heat exchanger 46. The portion 64 of the first air stream 30 enters the first inlet 50 and flows through the plurality of first passages 60 of the heat exchanger 46, while the portion 66 of the second air stream 36 enters the second inlet 52 and flows through the plurality of second passages 62 of the heat exchanger 46. While flowing through the plurality of first and second passages 60, 62 of the heat exchanger 46, heat is transferred from the portion 64 of the first air stream 30 to the portion of 66 of the second air stream 36.

Due to the heat transfer via heat exchanger 46, the portion 64 of the first air stream 30 is cooled and comprises the CCA 56, which flows out of the first exit 54 and onto the components of the gas turbine engine 20 that need cooling. For example, CCA 56 may be directed to the compressor section 24 and the turbine section 28, such as to blades 68 and rim cavities 70 of a high pressure compressor 72 and/or a high pressure turbine 74. CCA 56 may certainly be used to cool blades and rim cavities of a low pressure compressor and/or a low pressure turbine, and other hot components of the gas turbine engine 20 as well. Furthermore, air flow 76 from a combustor 78 of the gas turbine engine 20 may be used to mix with the CCA 56 from the heat exchanger 46 in order to increase air pressure of the CCA 56 for delivery to the hot components (e.g., blades 68 and rim cavities 70).

In addition, since the second air stream 36 has a higher pressure than the third air stream 40, the portion 66 of the second air stream 36 (which has a higher temperature after heat transfer via heat exchanger 46) flows out of the second exit 58 and into the third air stream 40. Therefore, heat from the portion 64 of the first air stream 30 is ultimately transferred to the third air stream 40. Since the heat exchanger 46 is located between the second air stream 36 and the third air stream 40, the pressure difference between the second and third air streams 36, 40, provides efficient flow of the portion 66 of the second air stream 36 into the third air stream 40. It is to be understood that although shown and described as being positioned between the second air stream 36 and the third air stream 40, heat exchanger 46 may be positioned between any two air streams which have a pressure difference relative to each other.

Figure 3:
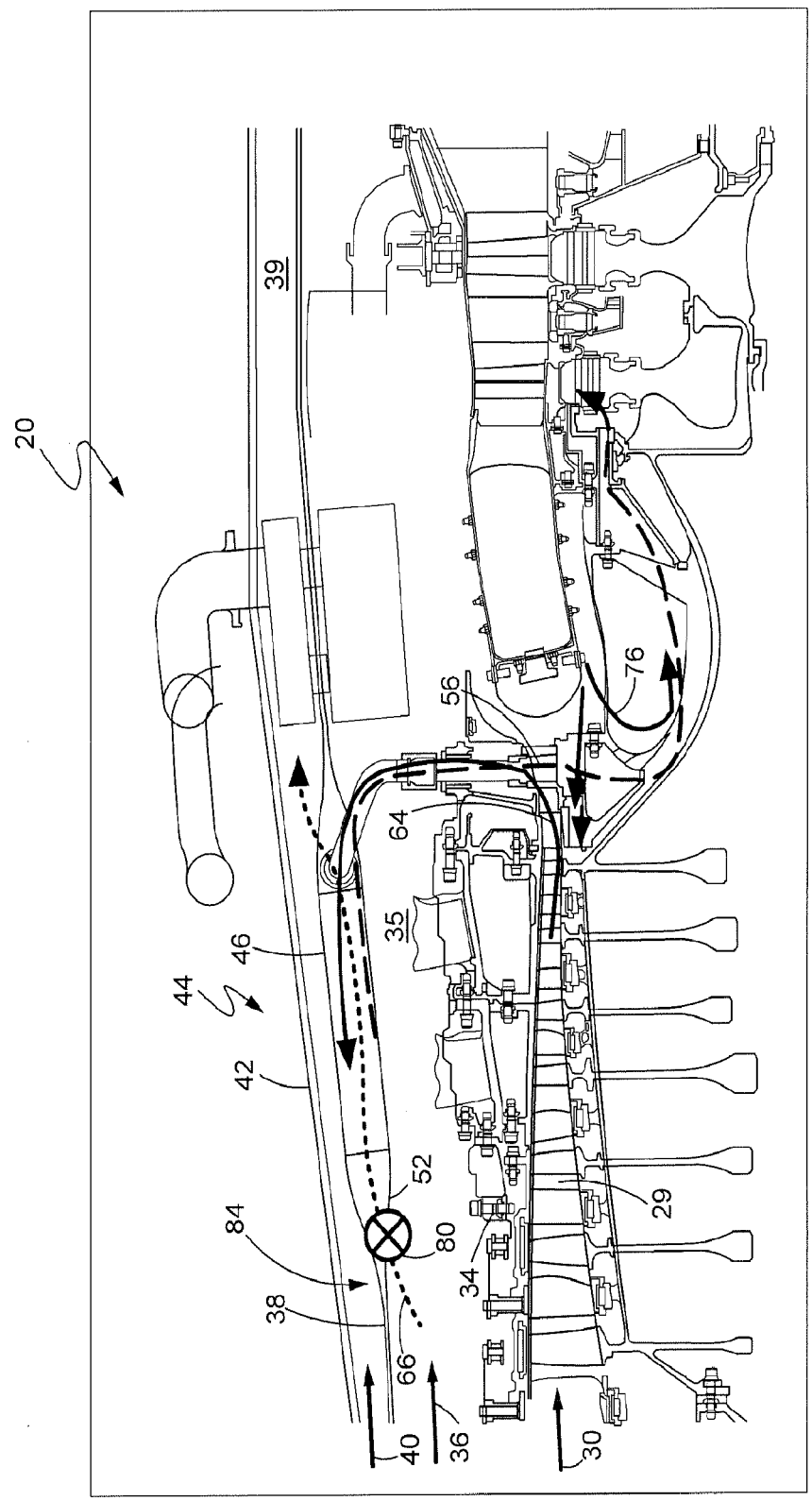
FIG. 3 is a cross-sectional view of a flow metering device positioned near a forward side of the heat exchanger system of FIG. 2, according to another embodiment of the present disclosure.

Turning now to FIG. 3, with continued reference to FIGS. 1 and 2, the heat exchanger system 44 may further include a flow metering device 80. The flow metering device 80 may be configured to control flow through the heat exchanger 46. For example, when cooling or CCA is required during engine operation, the flow metering device 80 may allow flow (e.g. portions 64 of the first air stream 30, portion 66 of the second air stream 36, and CCA 56) through the heat exchanger 46. When cooling or CCA is not required, the flow metering device 80 may actuate to stop flow through the heat exchanger 46, thereby reducing pressure loss incurred via flow through the heat exchanger 46. In addition, the flow metering device 80 may have an aerodynamic design or shape configured to reduce pressure loss.

The flow metering device 80 may comprise, without limitation, a door, a valve, a butterfly valve, a gate valve, check valve, or any other modulating device that can regulate flow through the heat exchanger 46. For example, as shown best in FIG. 4, the flow metering device 80 may comprise a plurality of slats 82 in a louver style arrangement. It is to be understood that although the slats 82 are oriented horizontally in FIG. 4, they may be arranged in a vertical or angled orientation as well. Furthermore, the flow metering device 80 may have a low pressure loss design in order to maximize the pressure available to the heat exchanger 46. The flow metering device 80 may have an on or open position to allow flow through the heat exchanger 46 and an off or closed position to stop flow through the heat exchanger 46. In addition, the flow metering device 80 may have positions between fully open and fully closed in order to modify the amount of flow through the heat exchanger 46, such as, depending on specific CCA requirements.

Various methods may be used to the flow metering device 80. For example, a sensor may be used to measure a pressure and/or temperature flow, or other condition, and the flow metering device 80 may be actuated to reach a certain set point or position based on the sensor feedback of the measured condition. The flow metering device 80 may also be independent of sensor feedback and may be actuated based on a set predetermined schedule, such as, based on flight conditions. In another example, the flow metering device 80 may be in communication with a controller, which may manage the flow metering device 80 according to a high fidelity control. The flow metering device 80 may be purely driven by the pressure difference between the second and third air streams 36, 40 such that the flow metering device 80 opens as the pressure difference increases and closes as the pressure difference decreases. In yet another example, the flow metering device 80 may comprise a complex flow control device having aerodynamic bearings and a variety of flow metering orbises controlled by an engine computer controller.

Figure 5:
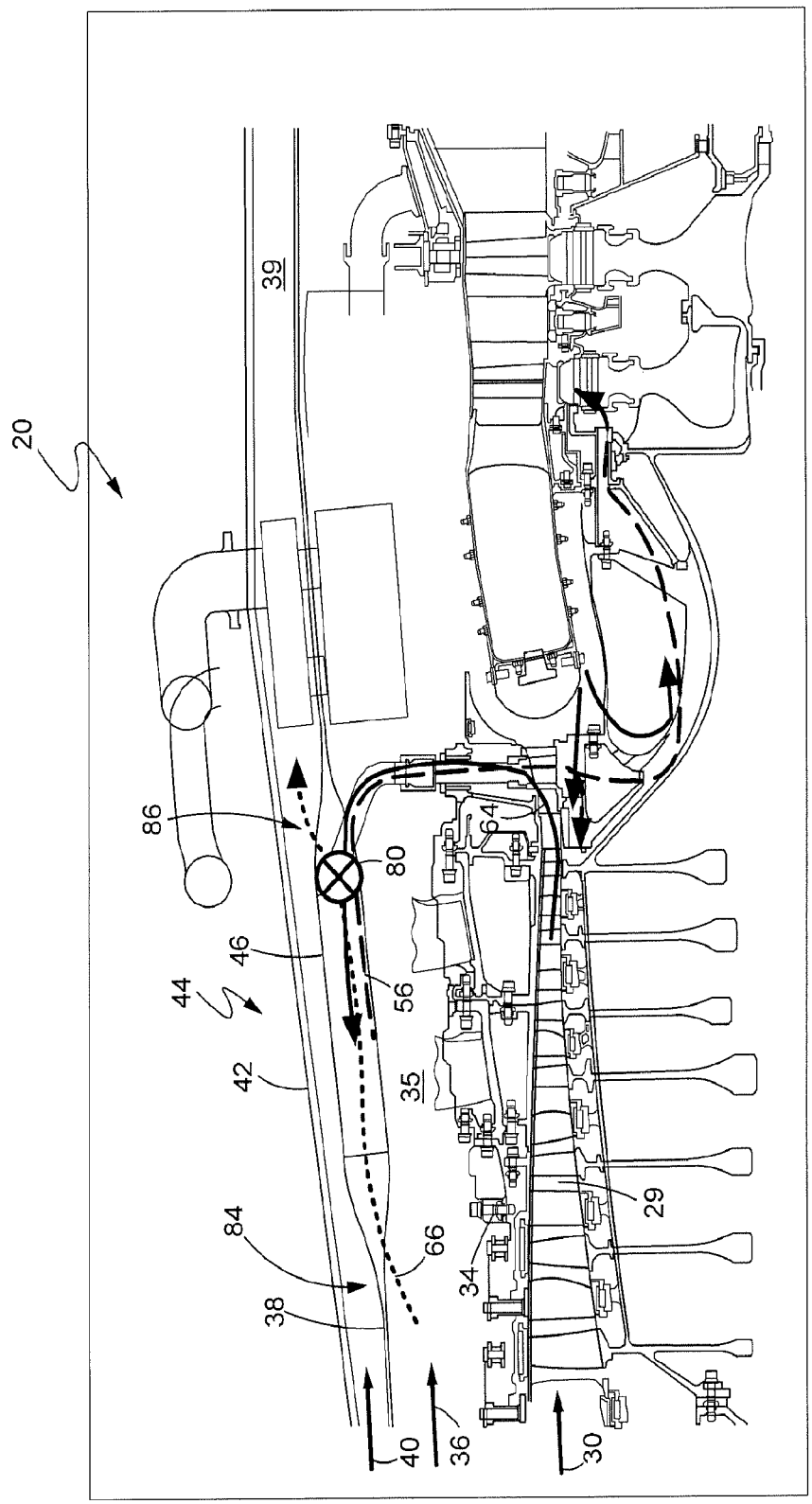
FIG. 5 is a cross-sectional view of a flow metering device positioned near an aft side of the heat exchanger system of FIG. 2, according to another embodiment of the present disclosure.
Figure 6:
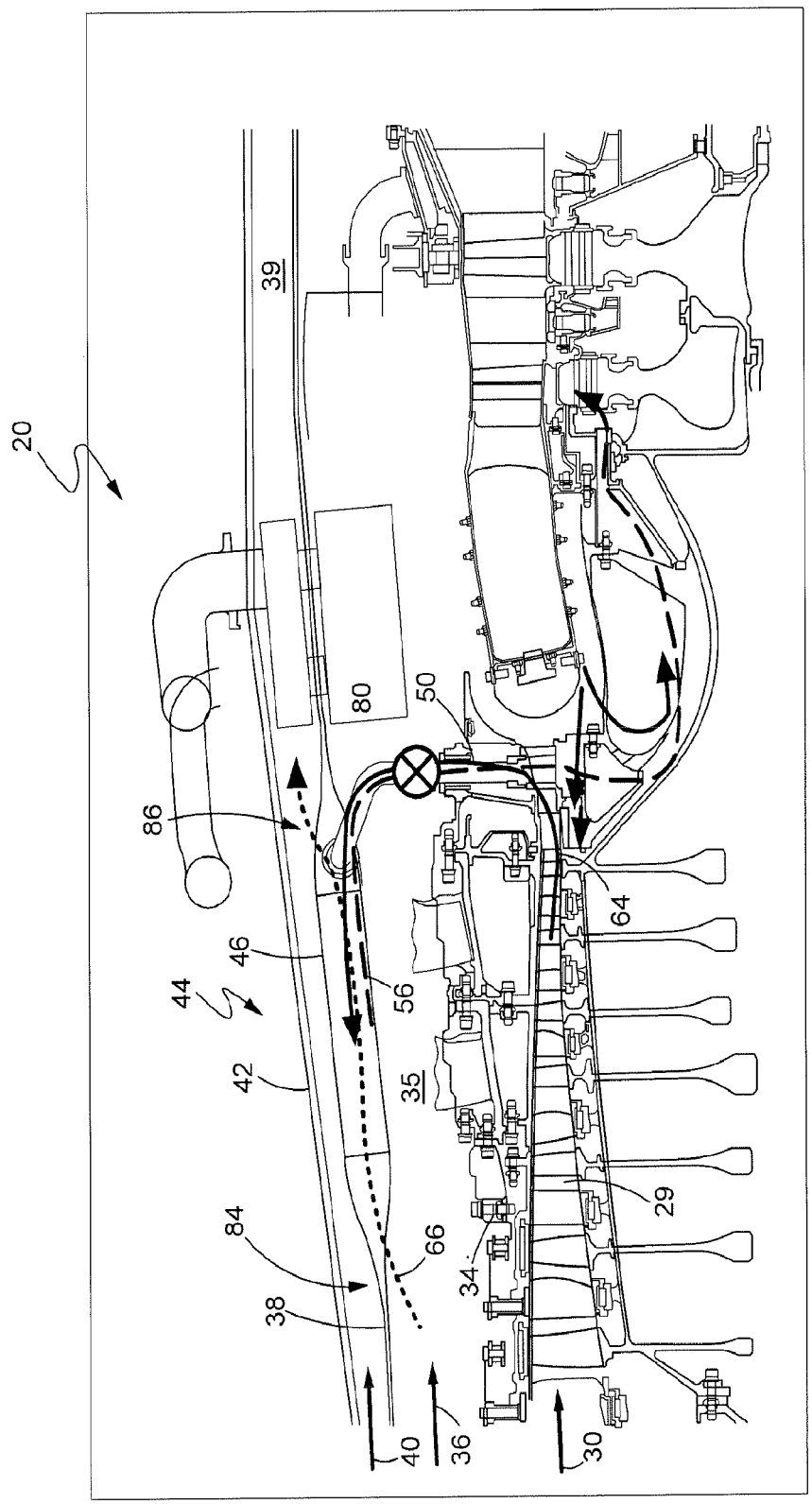
FIG. 6 is a cross-sectional view of a flow metering device positioned on an inlet of the heat exchanger system of FIG. 2, according to another embodiment of the present disclosure.
Figure 7:
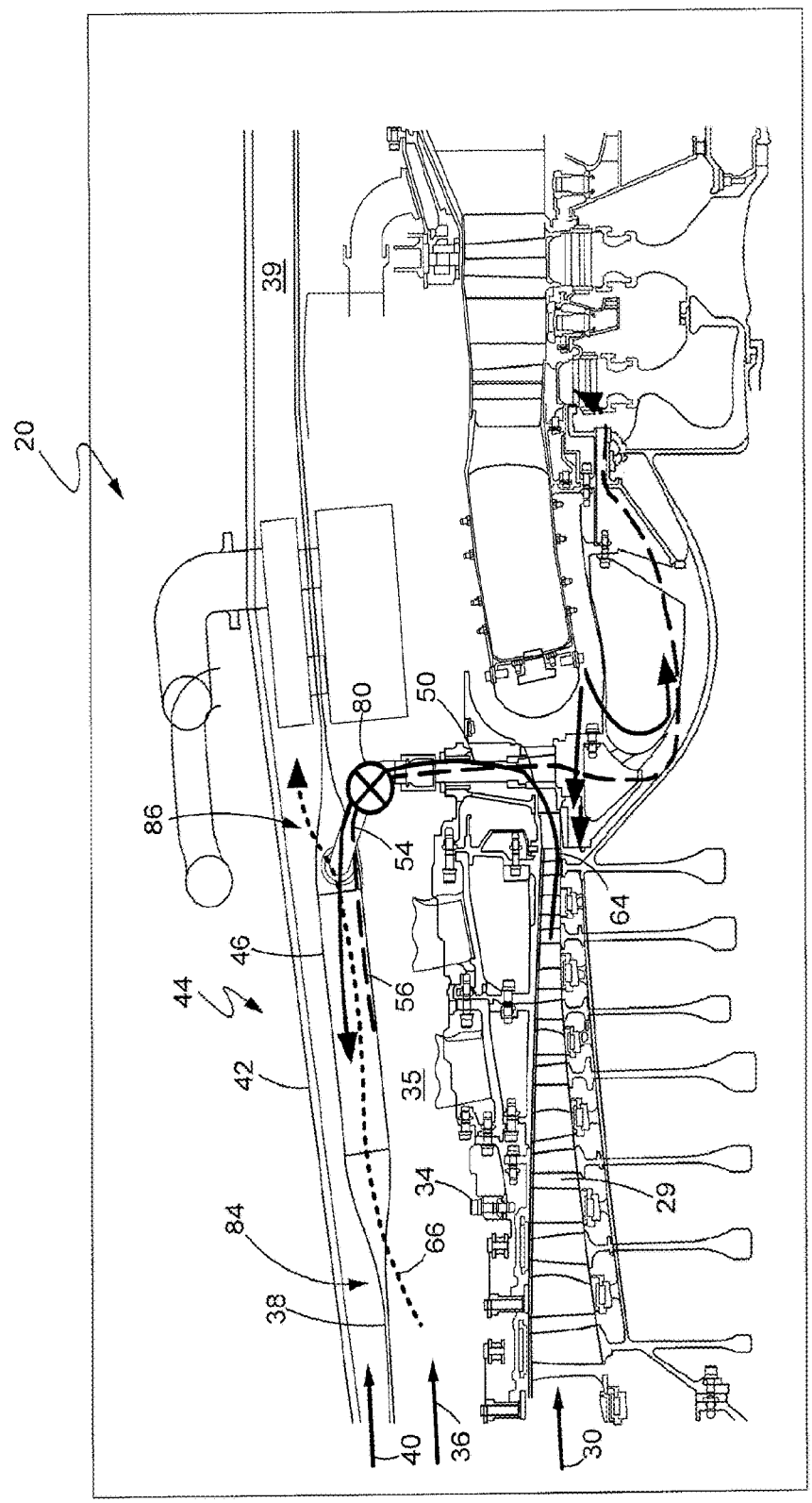
FIG. 7 is a cross-sectional view of a flow metering device positioned on an exit of the heat exchanger system of FIG. 2, according to another embodiment of the present disclosure.
Figure 8:
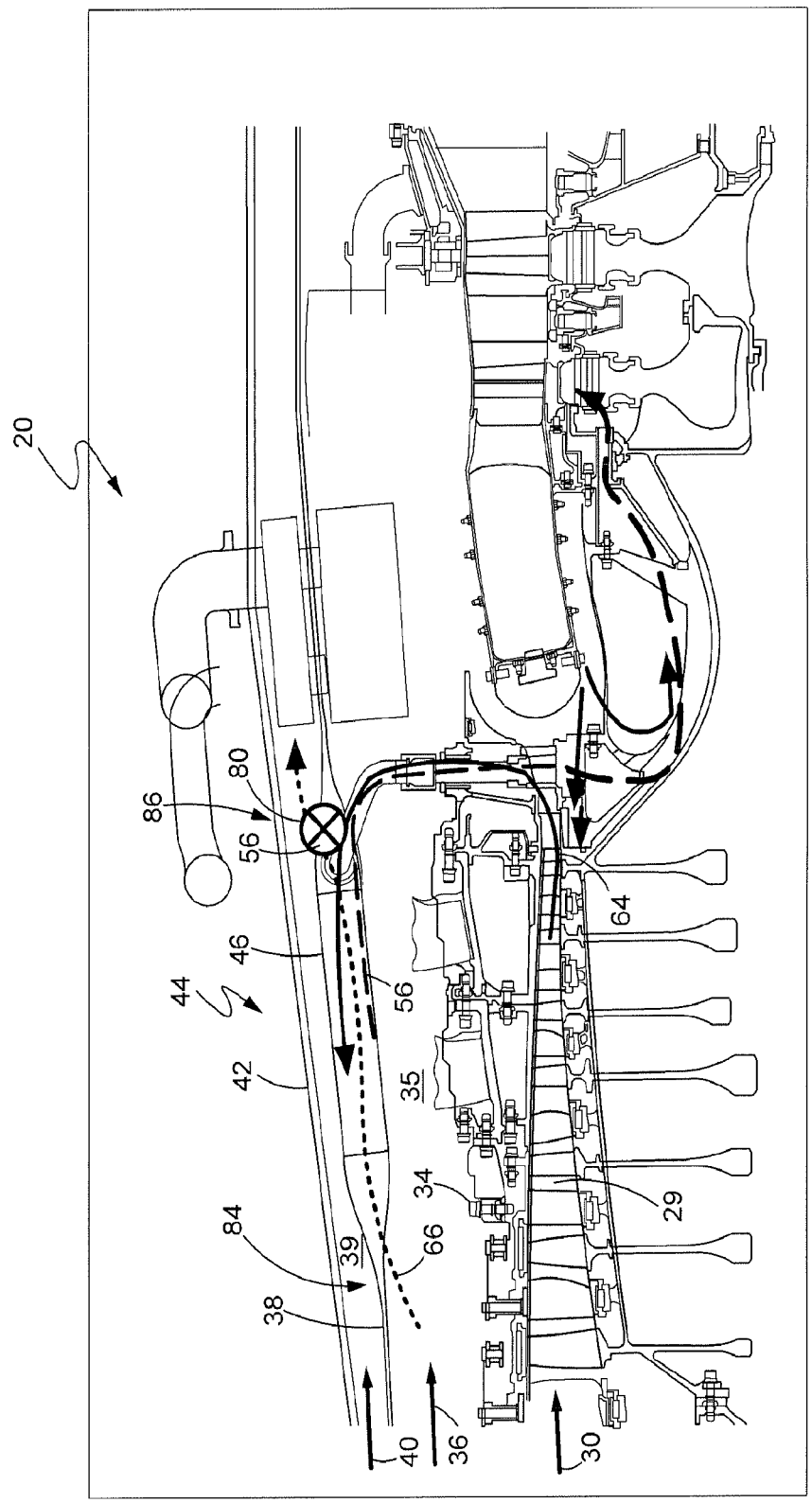
FIG. 8 is a cross-sectional view of a flow metering device positioned on another exit of the heat exchanger system of FIG. 2, according to another embodiment of the present disclosure.

As shown in FIG. 3, the flow metering device 80 may be positioned at a front or forward side 84 of the heat exchanger 46. For example, the flow metering device 80 may be located on the second inlet 52 associated with the portion 66 of the second air stream 36. In another example, shown best in FIG. 5, the flow metering device 80 may be positioned at a rear or aft side 86 of the heat exchanger 46. As shown in FIG. 6, the flow metering device 80 may be located on the first inlet 50 associated with the portion 64 of the first air stream 30. As shown in FIG. 7, the flow metering device 80 may also be located on the first exit 54 associated with the CCA 56. As shown in FIG. 8, the flow metering device 80 may be located on the second exit 58 associated with the third air stream 40, as well.

It is to be understood that the flow metering device 80 may also be positioned in other locations than that shown and described. Furthermore, the heat exchanger system 44 may have more than one flow metering device 80 or no flow metering device 80 at all. For example, a first flow metering device may be positioned on the forward side 84 of the heat exchanger 46 and a second flow metering device may be positioned on the aft side 86 of the heat exchanger 46, such as, on any of the inlets 50, 52 and/or exits 54, 58.

Figure 4:
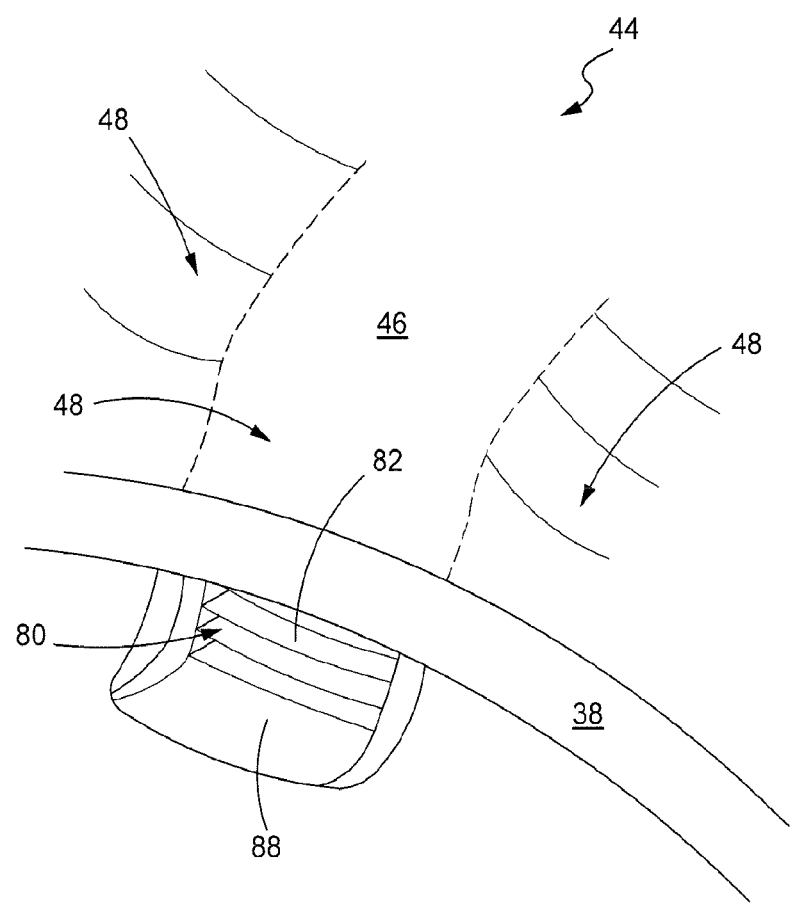
FIG. 4 is a perspective view of an integrated scoop and flow metering device, according to another embodiment of the present disclosure.

Furthermore, the heat exchanger system 44 may include a scoop 88 integrated into the flow metering device 80, as shown best in FIG. 4. The scoop 88 may be designed to capture and direct maximum air flow into the heat exchanger 46 at an elevated pressure. In so doing, the scoop 88 minimizes pressure loss and reduces exit temperatures of the heat exchanger 46. The integrated scoop 88 and flow metering device 80 enables flow capture and modulation of flow. It is to be understood that the scoop 88 may not be integrated with the flow metering device 80, and that the heat exchanger system 44 may have a separate scoop 88 in addition to the flow metering device(s) 80.

Figure 9:
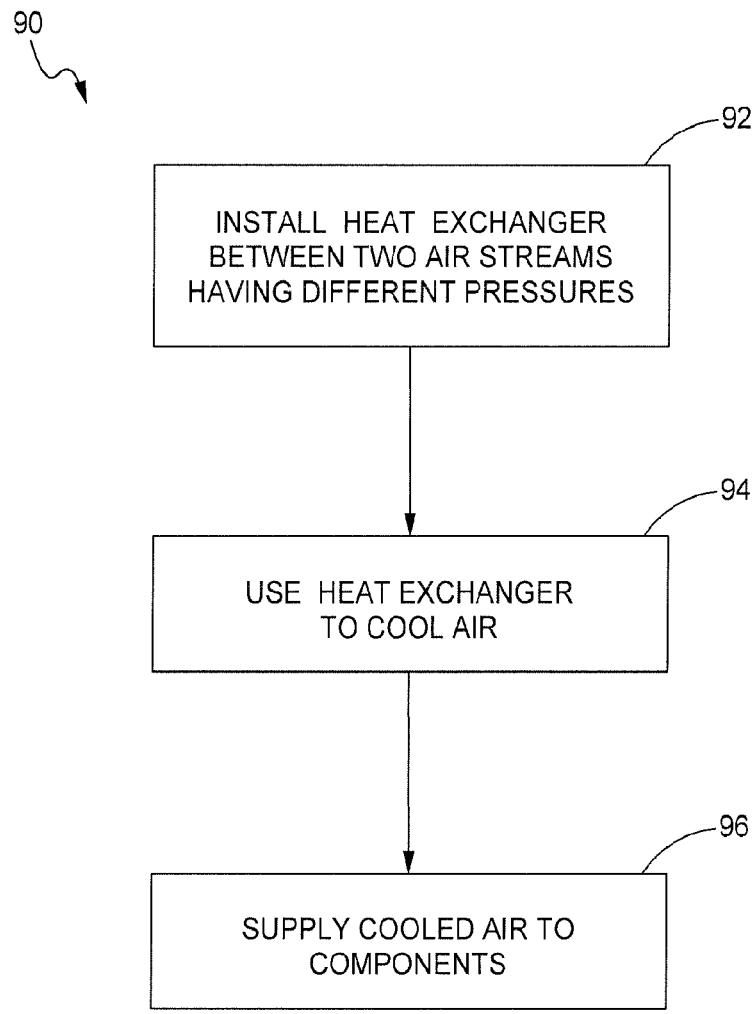
FIG. 9 is a flowchart outlining a process for cooling components of a gas turbine engine, according to yet another embodiment of the present disclosure.

Referring now to FIG. 9, with continued reference to FIGS. 1-8, a flowchart outlining a process 90 for cooling components of the gas turbine engine 20 is shown, according to another embodiment of the present disclosure. At a block 92, the heat exchanger 46 may be installed between two air streams 36, 40 having different air pressures. At a block 94, the heat exchanger 46 may be used to cool air 64 from a core flow path 30 of the gas turbine engine 20. The cooled air or CCA 56 from the heat exchanger 46 may be supplied to components of the gas turbine engine 20.

INDUSTRIAL APPLICABILITY

From the foregoing, it can be seen that the teachings of this disclosure can find industrial application in any number of different situations, including but not limited to, gas turbine engines. Such engines may be used, for example, on aircraft for generating thrust, or in land, marine, or aircraft applications for generating power.

The present disclosure provides a heat exchanger system and process for cooling components of the gas turbine engine. In the disclosed system and method, the heat exchanger is installed in an aerodynamically contoured area between (cross-stream) two bypass air streams around the engine core. The pressure difference between the two bypass air streams provides a cold side flow, which is used to cool air from the engine core.

Furthermore, the flow metering device of the present disclosure may modulate flow between the two air streams depending on the cooling requirements. The flow metering device at the front of the heat exchanger is a simplified, low cost solution. Moreover, the integrated scoop increases flow through the heat exchanger, thereby minimizing pressure loss and reducing a cold side exit temperature. Positioning the flow metering device at the rear of the heat exchanger (e.g., CCA or hot side exit) may provide a desirable lower pressure and/or separated exhaust, while positioning the flow metering device on the engine core air stream (hot side) inlet may minimize pipe volume and protect the heat exchanger from large temperature excursions.

Compared to prior art heat exchangers which were typically installed in-line with an air stream flow, the aerodynamic contouring applied to the installed cross-stream heat exchanger incurs a smaller amount of pressure loss. In addition, since cooling is not required across the entire mission profile, the disclosed heat exchanger system with a flow metering device allows reduced pressure loss for a specific thrust requirement, which results in reduced fuel burn.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed, but rather includes all embodiments and equivalents encompassed within the claims appended hereto as well.

What is claimed is:

1. A heat exchanger system for a gas turbine engine, comprising:
   a first structure at least partially defining a first plenum configured to receive a first air stream;
   a second structure at least partially defining a second plenum configured to receive a second air stream having lower pressure than the first air stream;
   a third structure at least partially defining a third plenum configured to receive a third air stream having lower pressure than the second air stream; and
   a heat exchanger configured for operative communication with the first air stream, the second air stream, and the third air stream, the heat exchanger configured to transfer heat from a portion of the first air stream to a portion of the second air stream at the heat exchanger, the portion of the second air stream flowing to the third air stream, the heat exchanger disposed between the second structure and the third structure.

2. The heat exchanger system of claim 1, wherein the heat exchanger is disposed within a second duct surrounding the second air stream, the second duct including aerodynamic surfaces surrounding the heat exchanger.

3. The heat exchanger system of claim 1, wherein the first air stream comprises a core flow path, and each of the second air stream and the third air stream is comprised of a bypass flow path.

4. The heat exchanger system of claim 1, wherein the heat exchanger includes:
   a first inlet associated with the first air stream,
   a first exit associated with a cooling air,
   a plurality of first passages extending from the first inlet to the first exit,
   a second inlet associated with the second air stream,
   a second exit associated with the third air stream, and
   a plurality of second passages extending from the second inlet to the second exit,
   wherein a portion of the first air stream flows into the first inlet through the plurality of first passages and out of the first exit,
   wherein a portion of the second air stream flows into the second inlet through the plurality of second passages and out of the second exit, and
   wherein the heat exchanger transfers heat between the portion of the first air stream in the plurality of first passages and the portion of the second air stream in the plurality of second passages.

5. The heat exchanger system of claim 4, wherein the cooling air exiting from the first exit of the heat exchanger is used to cool components of the gas turbine engine.

6. The heat exchanger system of claim 1, wherein the heat exchanger includes a scoop designed to capture air flow.

7. The heat exchanger system of claim 1, wherein the heat exchanger includes a flow metering device configured to control flow through the heat exchanger.

8. The heat exchanger system of claim 7, wherein the flow metering device is positioned proximate a forward side of the heat exchanger.

9. The heat exchanger system of claim 7, wherein the flow metering device is positioned proximate an aft side of the heat exchanger.

10. The heat exchanger system of claim 7, wherein the flow metering device is positioned proximate an inlet or an exit of the heat exchanger.

11. A method for cooling components of a gas turbine engine, the method comprising:
providing a first structure at least partially defining a first plenum configured to receive a first airflow; providing a second structure at least partially defining a second plenum configured to receive a second airflow having lower pressure than the first airflow; providing a third structure at least partially defining a third plenum configured to receive a third airflow having lower pressure than the second airflow;
installing a heat exchanger between the second structure and the third structure,
using the heat exchanger to transfer heat from a portion of the first airflow to a portion of the second airflow at the heat exchanger, the first airflow air originating from a core flow path of the gas turbine engine; and supplying a portion of the second airflow to the third airflow.

12. The method of claim 11, further comprising providing the heat exchanger with a flow metering device configured to modulate flow through the heat exchanger.

13. The method of claim 12, further comprising selectively allowing flow through the heat exchanger using the flow metering device.

14. The method of claim 13, further comprising opening the flow metering device to allow flow through the heat exchanger when cooled first airflow is required.

15. The method of claim 14, further comprising closing the flow metering device to stop flow through the heat exchanger when cooled first airflow is not required.

16. The method of claim 12, further comprising providing the flow metering device proximate an inlet or an exit of the heat exchanger.

17. A gas turbine engine comprising:
a first air duct surrounding a first air stream;
a second air duct surrounding a second air stream, the second air stream surrounding the first air duct and having a lower pressure than the first air stream;
a third air duct surrounding a third air stream, the third air stream surrounding the second air duct and having a lower pressure than the second air stream; and
a heat exchanger disposed between the second air duct and the third air duct, the heat exchanger configured to exchange thermal energy between the first airstream and the second air stream.

18. The gas turbine engine of claim 17, wherein air flow from a combustor mixes with a cooling air from the heat exchanger for delivery to hot components.

19. The gas turbine engine of claim 18, wherein the second air duct includes fairings surrounding the heat exchanger.

20. The gas turbine engine of claim 17, wherein the heat exchanger includes an integrated scoop and flow metering device to capture and modulate air flow.

\* \* \* \* \*